United States Patent [19]
Sato et al.

[11] Patent Number: 5,590,404
[45] Date of Patent: Dec. 31, 1996

[54] BASE STATION TRANSMISSION-RECEPTION APPARATUS FOR CELLULAR SYSTEM

[75] Inventors: Toshifumi Sato; Yukitsuna Furuya, both of Tokyo, Japan

[73] Assignee: NEC Corporation, Tokyo, Japan

[21] Appl. No.: 337,471

[22] Filed: Nov. 8, 1994

[30] Foreign Application Priority Data

Nov. 8, 1993 [JP] Japan ..................... 5-278208

[51] Int. Cl.$^6$ ................................. H04B 7/04
[52] U.S. Cl. .................. 455/53.1; 455/33.3; 455/56.1
[58] Field of Search .................... 455/33.1, 33.3, 455/33.4, 53.1, 54.1, 56.1, 62, 63, 67.1; 379/59; 370/58.2, 58.3, 85.7; 340/825.03, 825.04

[56] References Cited

U.S. PATENT DOCUMENTS

| | | | |
|---|---|---|---|
| 5,048,116 | 9/1991 | Schaeffer | 455/33.3 |
| 5,193,109 | 3/1993 | Lee | 455/33.3 |
| 5,392,278 | 2/1995 | Teel et al. | 370/85.7 |

FOREIGN PATENT DOCUMENTS

WO9217954 10/1992 WIPO.
WO9311627 6/1993 WIPO.

OTHER PUBLICATIONS

Moriji Kuwabara, "Digital Mobile Communication," Science Newspaper Company, pp. 246–249, 258–259, and 368.

*Primary Examiner*—Reinhard J. Eisenzopf
*Assistant Examiner*—Thanh Le
*Attorney, Agent, or Firm*—Sughrue, Mion, Zinn, Macpeak & Seas

[57] ABSTRACT

It is an object of the present invention to provide a base station transmission-reception apparatus wherein an increase in the number of sectors does not increase the load to a control center arising from hand-over between sectors and does not increase the number of processing sections for each channel. In the apparatus, each of baseband signal processing sections 1-1 to 1-N includes a transmission signal selection circuit 202 for outputting a transmission signal from a transmission signal processing section 201 to only a sector antenna 107 indicated by a selection signal, a reception signal selection circuit 204 for selecting a reception signal of a sector indicated by the selection signal, a reception signal processing section 203 for detecting reception data corresponding to its own communication channel from the reception signal from a reception signal selection circuit 204, and a control section 207 for providing the selection signal to the transmission signal selection circuit and the reception signal selection circuit.

4 Claims, 9 Drawing Sheets

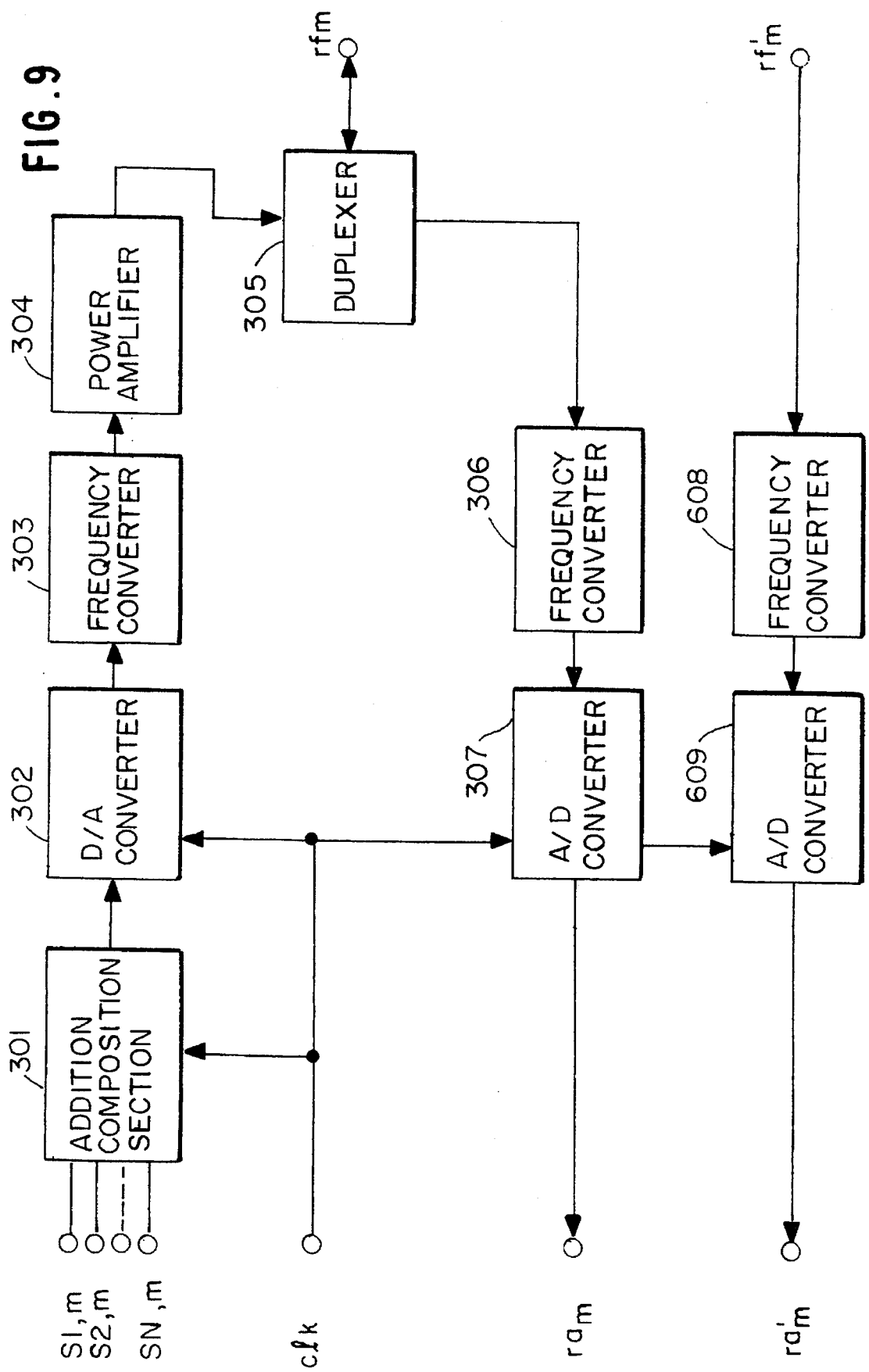

BASE STATION TRANSMISSION-RECEPTION APPARATUS FOR CELLULAR SYSTEM

BACKGROUND OF THE INVENTION

1. Field of the Invention

This invention relates to a base station transmission-reception apparatus for use with an automotive telephone system and a portable telephone system (cellular system), and more particularly to a base station transmission-reception apparatus wherein interference of the same frequency as another cell is reduced using a sector antenna.

2. Description of the Related Art

A base station transmission-reception apparatus for a cellular system which handles a large number of radio stations is disclosed in, for example, Moriji Kuwabara, "Digital Mobile Communication," Science Newspaper Company. The base station transmission-reception apparatus disclosed in the document includes, as shown in FIG. 1, a base station antenna 1, a common amplifier 2 for collectively amplifying the power of a plurality of radio channels, and a modulator-demodulator 3 for modulating and demodulating a digital signal.

A control center which communicates with the base station transmission-reception apparatus includes an exchange 103 including a circuit control apparatus 104. Where communications are performed using a digital signal, a speech processing apparatus 101 and a base station control apparatus 102 are provided between the base station and the control center. However, they may be provided in the base station and the control center.

A base station transmission-reception apparatus in urban areas which have a large amount of traffic adopts a sector cell configuration wherein a directional antenna is employed for base station antenna 1 in order to assure a high frequency utilization efficiency. A three-sector configuration wherein one cell is divided by 120 degrees into three sectors and a six-sector configuration wherein one cell is divided by 60 degrees into six sectors are in practically use. The base station antenna 1 includes two antennae including an antenna for common transmission and reception and the other for diversity reception antenna for each sector.

The common amplifier 2 includes a transmission amplifier 4 and a pair of outdoor reception amplifiers 2,008 and 2,009 for each sector as shown in FIG. 2. The transmission amplifier 4 includes a transmission common amplifier 41 for amplifying a transmission signal input from a modulator-demodulator and outputting the thus amplified signal to an outdoor reception amplifier 2,008 by way of an antenna feeder 2,001, a power separator-filter 42 for filtering a reception signal from the outdoor reception amplifier 2,008 and outputting the thus filtered signal as a reception signal to the modulator-demodulator, and power separator-filter 43 for filtering a reception signal from outdoor reception amplifier 2,009 and outputting the thus filtered signal as a diversity reception signal to the modulator-demodulator.

The transmission-reception antenna 2,006 is connected to the outdoor reception amplifier 2,008, and the diversity reception antenna 2,007 is connected to the outdoor reception amplifier 2,009.

The outdoor reception amplifier 2,008, to which the transmission-reception antenna 2,006 is connected, includes a power separator-filter 2,002, a reception common amplifier 5, and a duplexer 6 for using the transmission-reception antenna 2,006 commonly for transmission and reception. The outdoor reception amplifier 2,009, to which the diversity reception antenna 2,007 is connected includes a power separator-filter 2,003, a reception common amplifier 2,009, and a reception filter 2,005.

As shown in FIG. 3, the modulator-demodulator 3 provided in the base station 3,000 includes RF distribution composition sections 7 provided individually for the sectors, a transmitter-receiver 8, and an interface 3,006 which serves as a transmission line to and from a control center 9. An interface 3,006 is connected to control a bus control circuit 10, a supervision control circuit 3,006, a BCE interface 3,007 and a timing supply circuit 3,008 by way of a bus.

The transmitter-receiver 8 includes TRX sections 3,004 installed for individual carrier frequencies and a shelf control section 3,003 and performs π/4QPSK modulation/demodulation, demultiplexing of a TDMA (Time Division Multiple Access) signal, demultiplexing of an information channel and a control channel, and other necessary operations.

The base station 3,000 includes, in addition to the modulator-demodulator 3, an amplifier 3,001 for amplifying transmission and reception signals to be sent to and received from the RF distribution composition sections 7, a base station control apparatus 3,010 for controlling the inside of the base station, a synchronization dependent exchange 3,009, and other necessary apparatus not shown.

A synchronization dependent exchange 3,012, a base station control apparatus 3,015, a speech processing apparatus 3,014 and an exchange 3,013 are provided in the control center 9, and the control center 9 is connected to a fixed network 3,011 by way of the exchange 3,013.

In a conventional cellular system having the construction described above, the base station antennae 1, common amplifiers 2, RF distribution composition sections 7 of modulator-demodulator 3 and TRX sections 3,004 in transmitter-receiver 8 are provided independently for the individual sectors. When a mobile unit during communication moves from one sector to another sector, the control center is informed, and hand-over processing wherein channel allocation is performed again by the exchange of the control center is required.

In a cellular system, channel allocation is required in order to efficiently re-use a plurality of channels allocated to the system. While a fixed allocation system wherein an available frequency is allocated for each cell and each sector (for example, a system wherein a frequency is re-used for each 3 sectors and 7 cells) is in practical use, in order to further raise the frequency utilization efficiency, a dynamic channel allocation system wherein interference conditions of channels are monitored by individual base stations to allocate an available channel is investigated at present.

Further, in addition to the TDMA/FDMA (Frequency Division Multiple Access) systems wherein a channel is distinguished by a frequency and a time slot, a CDMA (Code Division Multiple Access) system wherein a frequency is commonly used by all channels and a channel is distinguished in accordance with a spreading code is in practical use.

In a base station transmission-reception apparatus of the sector cell configuration of the type described above, since the transmitter-receiver used for each sector is fixed, there is a disadvantage in that, if a mobile unit moves from one sector to another sector, hand-over processing described above is required, resulting in an equivalent increase in the load to the control center. Further, there is another disadvantage in that a number of transmitter-receivers corresponding to the maximum traffic must be prepared for each sector.

With a conventional base station transmission-reception apparatus, particularly where the dynamic channel allocation system or the CDMA system is employed, the frequency utilization efficiency can be enhanced by increasing the number of sectors. However, as the number of sectors is increased, the disadvantages described above becomes even more pronounced.

Further, since a conventional base station transmission-reception apparatus includes a radio section for each sector, it is economically disadvantageous in that, as the number of channels per apparatus increases, more time is required for operations for adjustment and inspection.

SUMMARY OF THE INVENTION

It is a first object of the present invention to provide a base station transmission-reception apparatus wherein an increase in the number of sectors does not increase the load on a control center arising from hand-over between sectors.

It is a second object of the present invention to provide a base station transmission-reception apparatus wherein an increase in the number of sectors does not increase the number of processing sections for each channel.

It is a third object of the present invention to provide a base station transmission-reception apparatus which has a reduced number of radio sections per base station.

According to an aspect of the present invention, there is provided a base station transmission-reception apparatus for a cellular system, comprising:

M sector antennae provided in a number equal to the number of sectors;

M collective modulation-demodulation sections connected to said M sector antennae; and N baseband signal processing sections provided in a number equal to the number of communication channels and connected to said M collective modulation-demodulation sections;

each of said baseband signal processing sections including:
  a control section for controlling a selection signal for controlling a transmission condition;
  a transmission signal processing section for producing a transmission signal in the form of a digital signal in accordance with a modulation method from transmission data;
  a transmission signal selection circuit for outputting the transmission signal from said transmission signal processing section to only one of said sector antennae which is indicated by the selection signal;
  a reception signal selection circuit for selecting and outputting one of M reception signals received by said sector antennae which is indicated by the selection signal; and
  a reception signal processing section for detecting reception data corresponding to its own communication channel from the reception signal from said reception signal selection circuit;

each of said collective modulation-demodulation sections including:
  transmission processing means for converting transmission signals from the transmission signal selection circuits into a transmission radio signal in the form of an analog signal and supplying the resulting signal to said sector antennae;
  frequency conversion means for converting reception radio signals of a bandwidth corresponding to the N communication channels received by said sector antennae collectively into a baseband signal by frequency conversion; and
  an analog-to-digital converter for converting the base band signal (analog) from said frequency conversion means into a digital signal and supplying the digital signal to the reception signal selection circuits.

According to another aspect of the present invention, there is provided a base station transmission-reception apparatus for a cellular system, comprising:

M first and second sector antennae provided for individual sectors for performing diversity reception;

M collective modulation-demodulation sections connected to said M first and second sector antennae; and N baseband signal processing sections provided in a number equal to the number of communication channels and connected to said M collective modulation-demodulation sections;

each of said baseband signal processing sections including:
  a control section for outputting a selection signal for controlling the transmission condition;
  a transmission signal processing section for producing a transmission signal in the form of a digital signal in accordance with a modulation method from transmission data;
  a transmission signal selection circuit for outputting the transmission signal from said transmission signal processing section only to one of said sector antennae which is indicated by the selection signal;
  a first reception signal selection circuit for selecting and outputting a reception signal of a sector indicated by the selection signal from among M reception signals received by said first M sector antennae;
  a second reception signal selection circuit for selecting and outputting a reception signal of a sector indicated by the selection signal from among M reception signals received by said second M sector antennae; and
  a reception signal processing section for performing diversity reception from the reception signals from the first and second M reception signal selection circuits to detect reception data corresponding to its own communication channel;

each of said collective modulation-demodulation sections including:
  transmission processing means for converting transmission signals from the transmission signal selection circuits into a transmission radio signal in the form of an analog signal and supplying the resulting signal to said sector antennae;
  frequency conversion means for converting reception radio signals of a bandwidth corresponding to the N communication channels received by said sector antennae collectively into a baseband signal by frequency conversion; and
  an analog-to-digital converter for converting the base band signal (analog) from said frequency conversion means into a digital signal and supplying the digital signal to the reception signal selection circuits.

In any case, each of said baseband signal processing sections may include:

a monitor signal selection circuit for selecting one reception signal from said collective modulation-demodulation sections and outputting the selected reception signal as a monitoring reception signal; and a reception quality monitoring section for monitoring the reception quality of the monitoring reception signal from said monitor signal selection circuit and supplying a monitor signal to said control section; and said control section may provide a selection signal for selecting a sector having the best reception quality to said transmission signal selection signal and said reception signal selection circuit in response to the monitor signal.

According to the present invention constructed as described above, a radio section is provided not for each channel but for each sector so that it may perform collective modulation and demodulation. Consequently, processing for each channel can be realized all with a digital circuit, and accordingly, a baseband signal processing section which performs processing for each channel can be connected to all sectors using a selection circuit which can be realized with a simple digital circuit. Accordingly, when a mobile unit moves from one sector to another sector, it is only necessary to change the sector selection within the baseband processing section, and there is no need to perform hand-over processing by a control center (exchange) as in the prior art.

Further, in the base station transmission-reception apparatus for a digital cellular system, by increasing the number of sectors, the antenna directivity can be directed to mobile units in communication for individual communication channels, and interference by an adjacent cell can be reduced. Consequently, the frequency re-utilization efficiency of the cellular system can be enhanced.

BRIEF DESCRIPTION OF THE DRAWINGS

FIG. 9 is a block diagram showing a collective modulation-demodulation section of the second embodiment of the present invention.

DETAILED DESCRIPTION OF THE PREFERRED EMBODIMENTS

The embodiments of the present invention are described in detail below with reference to the drawings.

Figure 1:
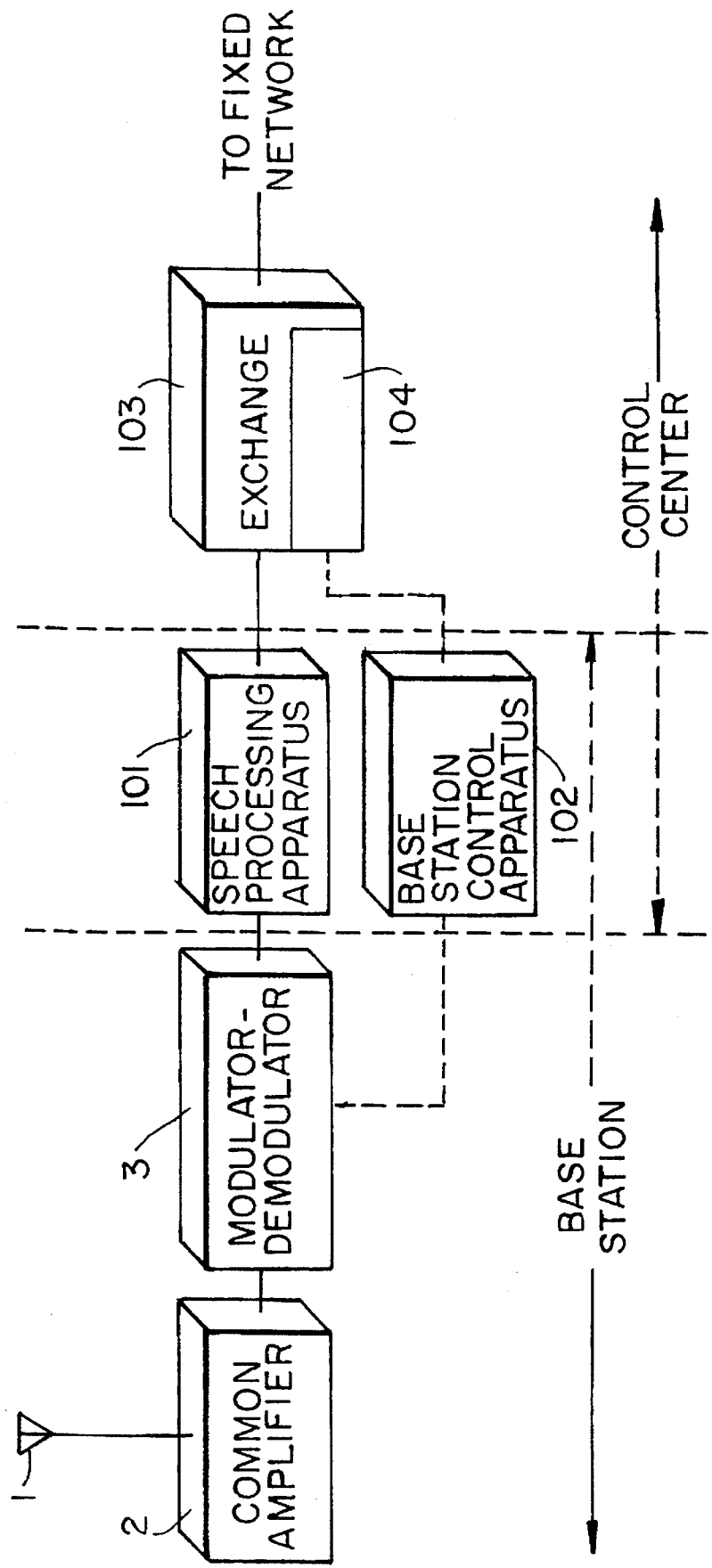
FIG. 1 is a block diagram showing the construction of a base station of a conventional digital cellular system.
Figure 2:
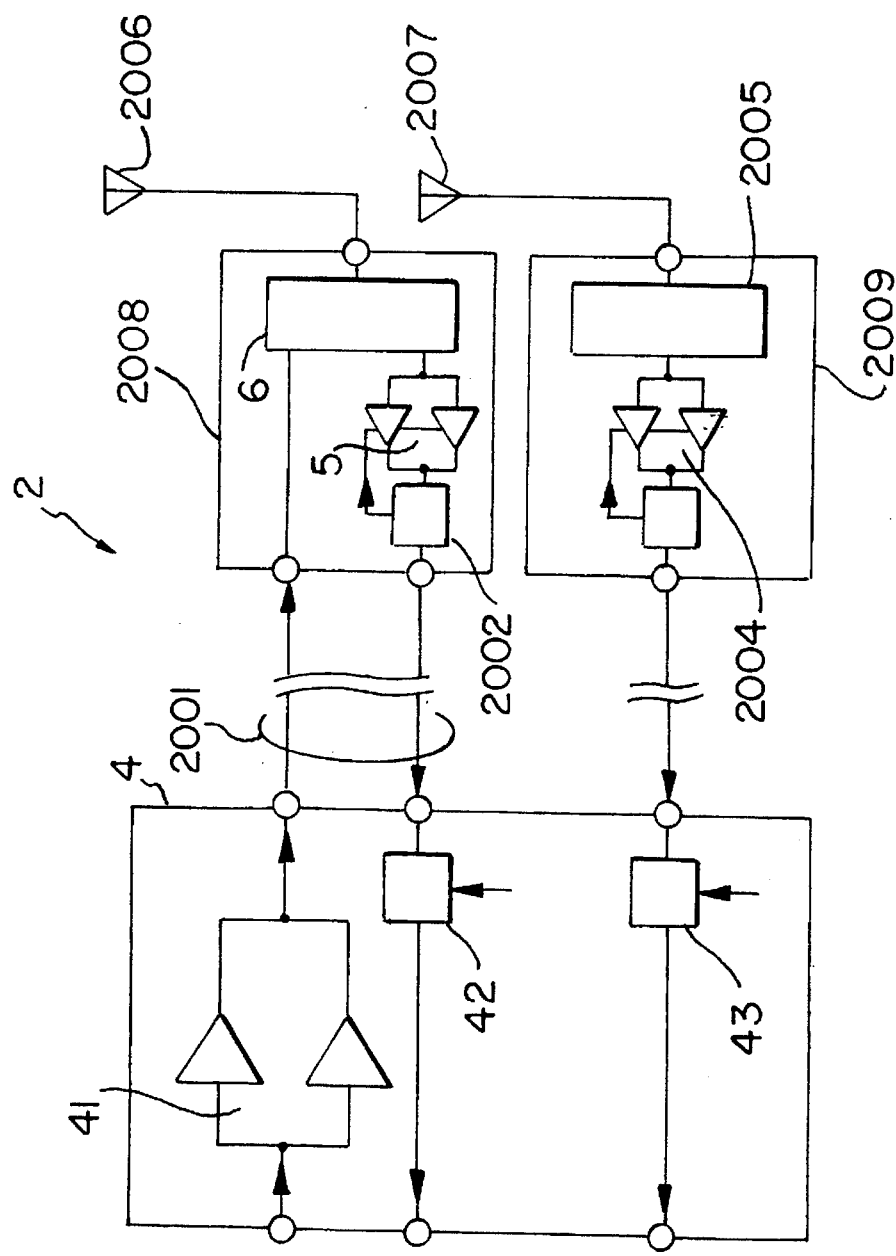
FIG. 2 is a block diagram showing the construction of an amplifier for a base station of the conventional digital cellular system.
Figure 3:
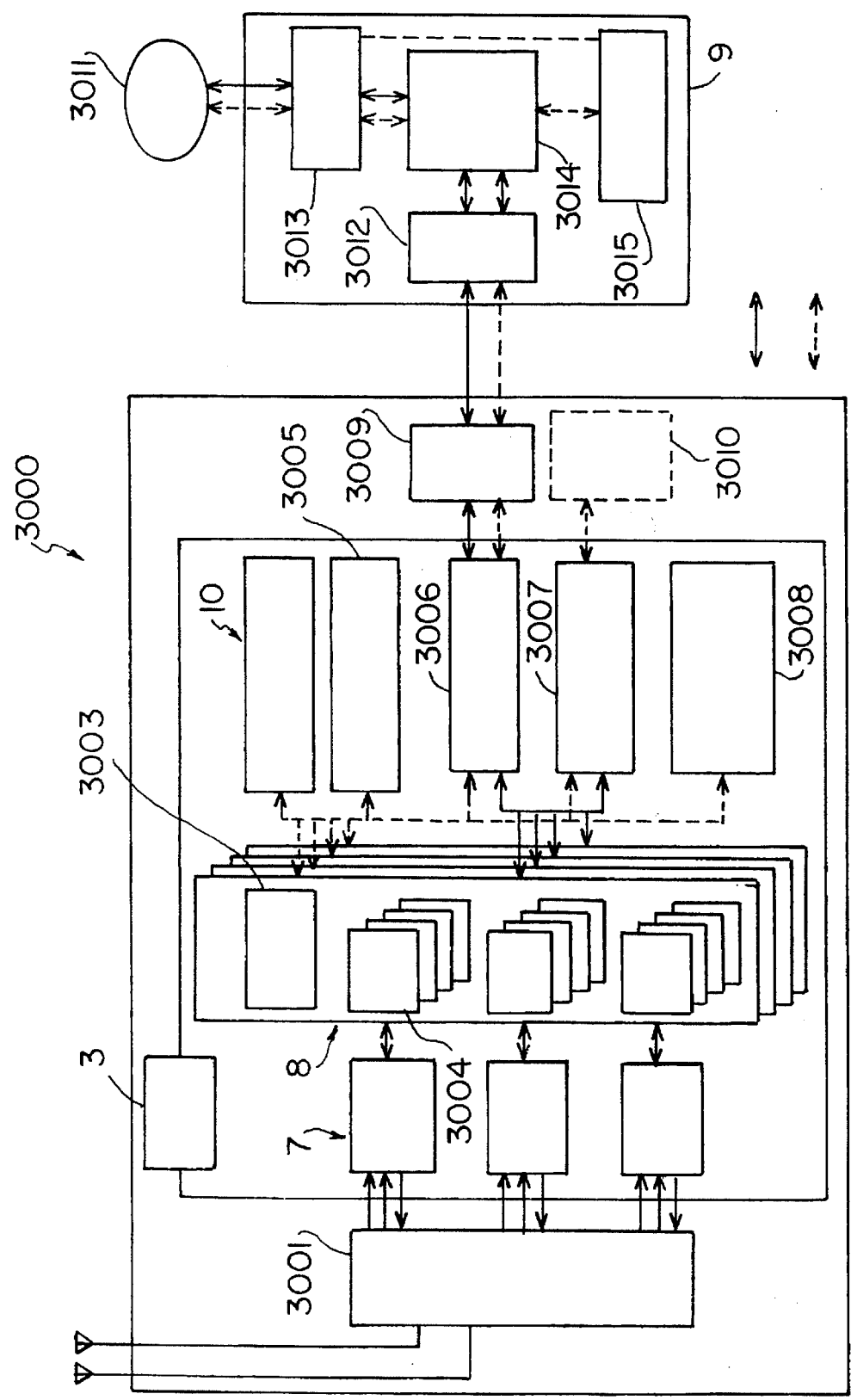
FIG. 3 is a block diagram showing the construction of a modulator-demodulator for a base station of the conventional digital cellular system.
Figure 4:
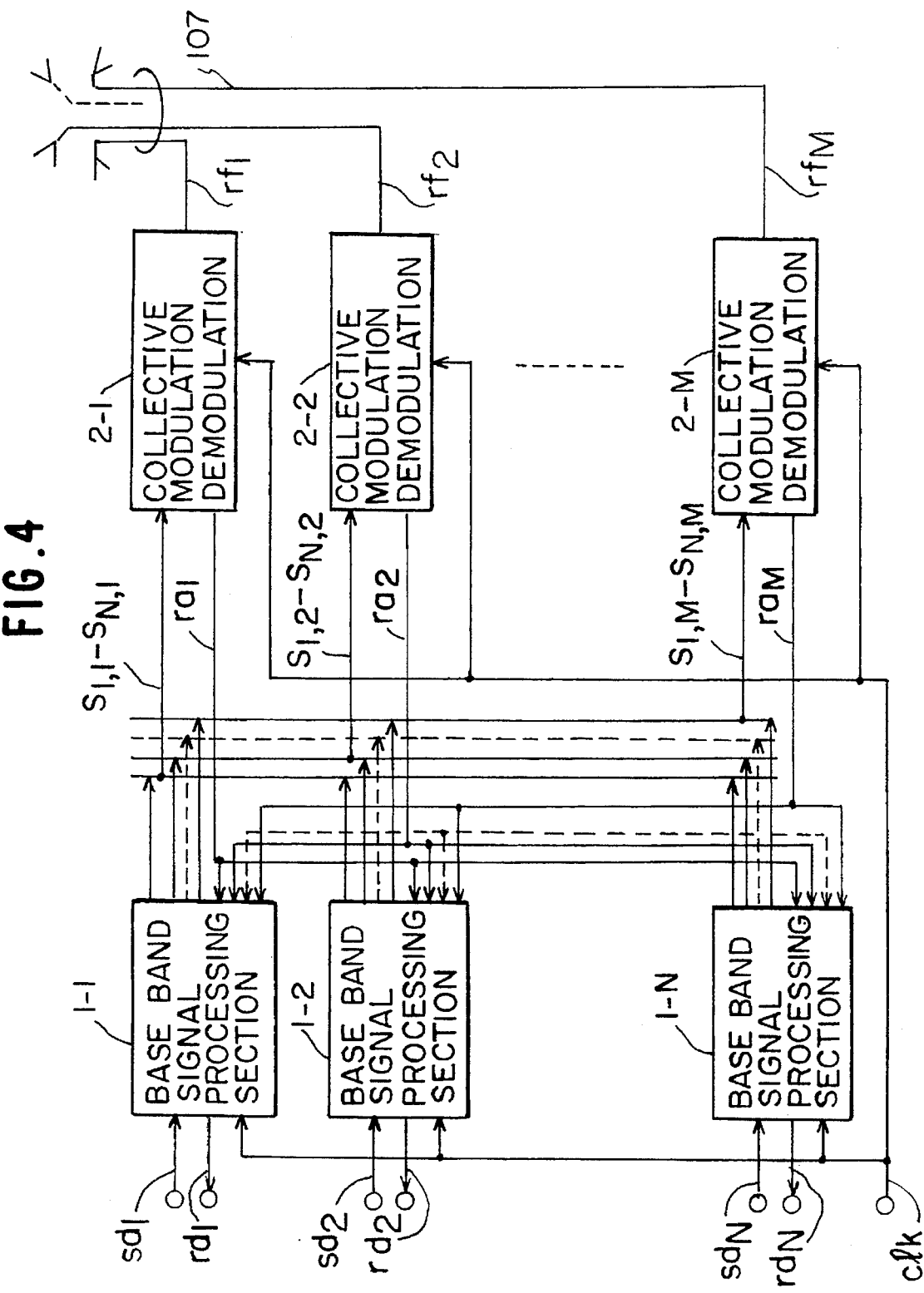
FIG. 4 is a block diagram showing a first embodiment of the present invention.

FIG. 4 is a block diagram showing the construction of the first embodiment of the present invention. A base station transmission-reception apparatus includes, as shown in FIG. 4, N (N is a positive integer representative of the number of communication channels) baseband signal processing sections 1-1 to 1-N, M (M is a positive integer representative of the number of sectors) collective modulation-demodulation sections 2-1 to 2-M connected to baseband signal processing sections 1-1 to 1-N, and M sector antennae 107 connected to collective modulation-demodulation sections 2-1 to 2-M.

Signal sdn (n=1 to N) is transmission data of the nth channel and is inputted to the nth baseband signal processing section. Signal sn,m (n=1 to N, m =1 to M) represents a transmission signal transmitted from the nth baseband signal processing section and inputted to the mth collective modulation-demodulation section. Signal ram (m=1 to M) represents a reception signal demodulated by the mth collective modulation-demodulation section and is supplied to all baseband signal processing sections 1-1 to 1-N. Signal rdn (n=1 to N) represents reception data of the nth channel and is outputted from the nth baseband signal processing section. Signal rfm (m=1 to M) represents a transmission/reception radio signal of the mth sector. Signal clk represents a clock signal for operating the individual circuits.

Figure 5:
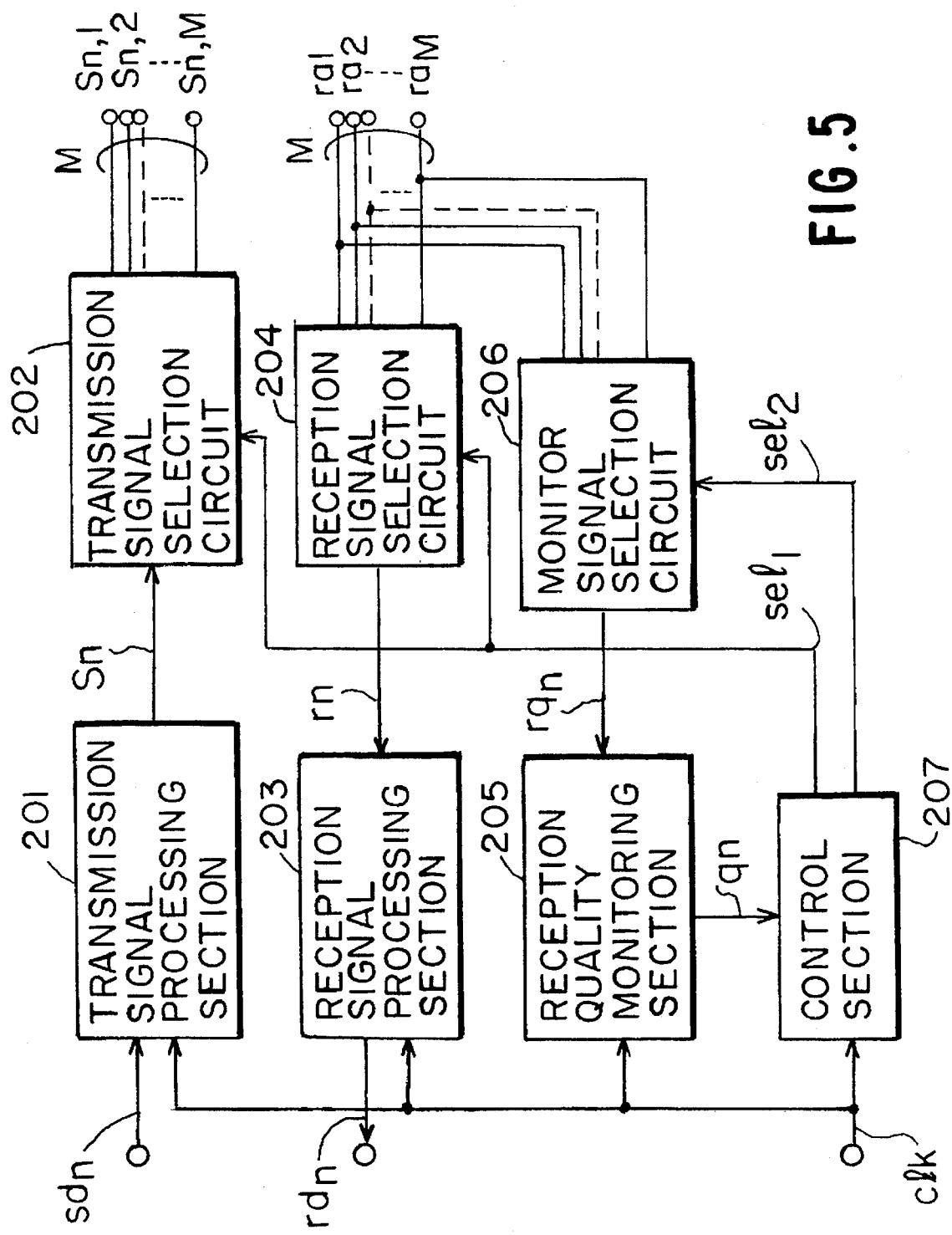
FIG. 5 is a block diagram showing a baseband signal processing section of the first embodiment of the present invention.

FIG. 5 is a block diagram showing the baseband signal processing sections in the first embodiment of the present invention. As shown in FIG. 5, each of the baseband signal processing sections 1-1 to 1-N includes a transmission signal processing section 201, a transmission signal selection circuit 202 connected to the transmission signal processing section 201, a reception signal processing section 203, a reception signal selection circuit 204 connected to the reception signal processing section 203, a reception quality monitoring section 205, a monitor signal selection circuit 206 connected to the reception quality monitoring section 205, and a control section 207 connected to the transmission signal selection circuit 202, the reception signal selection circuit 204, the reception quality monitoring section 205 and the monitor signal selection circuit 206.

The transmission signal processing section 201 produces transmission signal sn in accordance with a modulation method from transmission data sdn. The transmission signal selection circuit 202 outputs selection signal sn [sn,m=sn (m=sel1), sn,m=0 (m≠sel1)]indicated by the selection signal sel1. It is to be noted that reference sn denotes a transmission waveform represented by a digital signal. The reception signal selection circuit 204 selects reception signal rn [rn= ram (m=sel1)] indicated by the selection signal sel1 from among M reception signals ra1 to raM and outputs the selected reception signal rn to the reception signal processing section 203. The reception signal processing section 203 detects reception data rdn corresponding to its own communication channel from selected reception signal rn.

The monitor signal selection circuit 206 selects reception signal rqn [rqn=ram (m=sel2)] of a sector indicated by selection signal sel2 from among M reception signals ra1 to raM and outputs the selected reception signal rqn to the reception quality monitoring section 205. The reception quality monitoring section 205 monitors the quality of selected reception signal rqn in terms of the reception power, the interference wave power, the discrimination error power and the error rate and sends reception quality signal qn to the control section 207.

The control section 207 switches selection signal sel2 to the monitor signal selection circuit 206 at a predetermined time interval, monitors the reception qualities of each sector using the reception quality monitoring section 205 and outputs selection signal sell for selecting the sector having the best reception quality.

Accordingly, even if a mobile unit moves from one sector to another sector, an optimum sector is selected automatically within baseband signal processing sections 1-1 to 1-N. Further, since signals within baseband signal processing sections 1-1 to 1-N are all represented in digital signals (including signals obtained by analog-to-digital conversion), baseband signal processing sections 1-1 to 1-N can all be realized in digital circuits.

Figure 6:
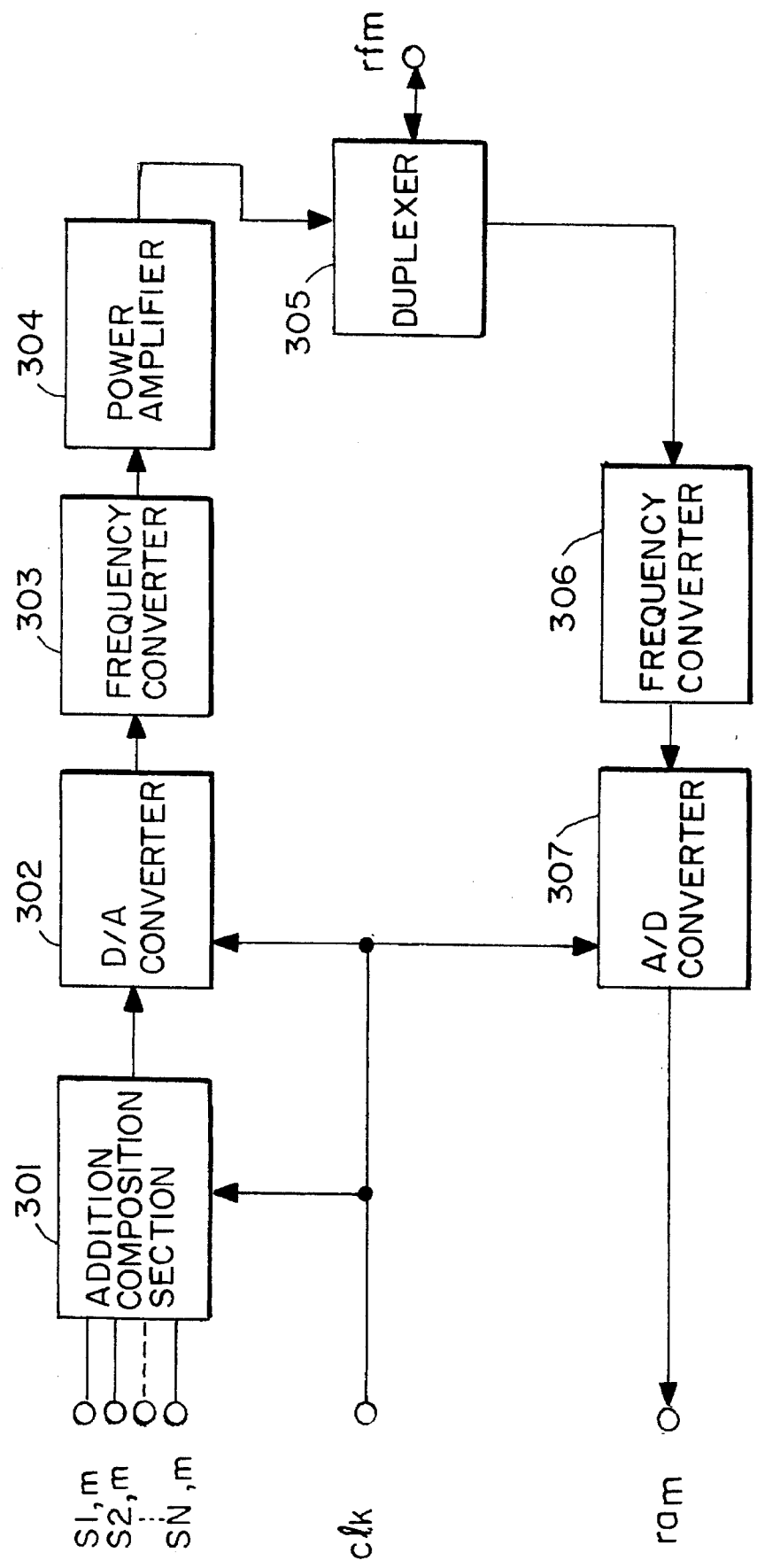
FIG. 6 is a block diagram showing a collective modulation-demodulation section of the first embodiment of the present invention.

FIG. 6 is a block diagram showing the construction of the collective modulation-demodulation sections in the first embodiment of the present invention. As shown in FIG. 6, each of collective modulation-demodulation sections 2-1 to 2-M includes an addition composition section 301 connected to the transmission signal selection circuit 202 for adding and composing transmission signals sn, a digital-to-analog converter 302 for converting a transmission signal (digital signal) obtained by addition and composition by the addition composition section 301 into an analog signal, a frequency converter 303 for converting the transmission baseband signal from the digital-to-analog converter 302 into a transmission radio signal, a power amplifier 304 for amplifying the transmission radio signal from the frequency converter 303, a duplexer 305 connected to the power amplifier 304 for using one antenna commonly for transmission and reception, a frequency converter 306 connected to the duplexer 305 for collectively converting reception radio signals of a bandwidth corresponding to the N channels into a base band signal (analog) by frequency conversion, and an analog-to-digital converter 307 for converting the baseband signal (analog signal) from the frequency converter 306 into a digital signal.

In a base station transmission-reception apparatus, diversity reception is performed in most cases by means of two antennae in order to prevent deterioration in reception quality caused by fading. As a second embodiment of the present invention, an apparatus which includes two sector antennae for diversity reception is described.

Figure 7:
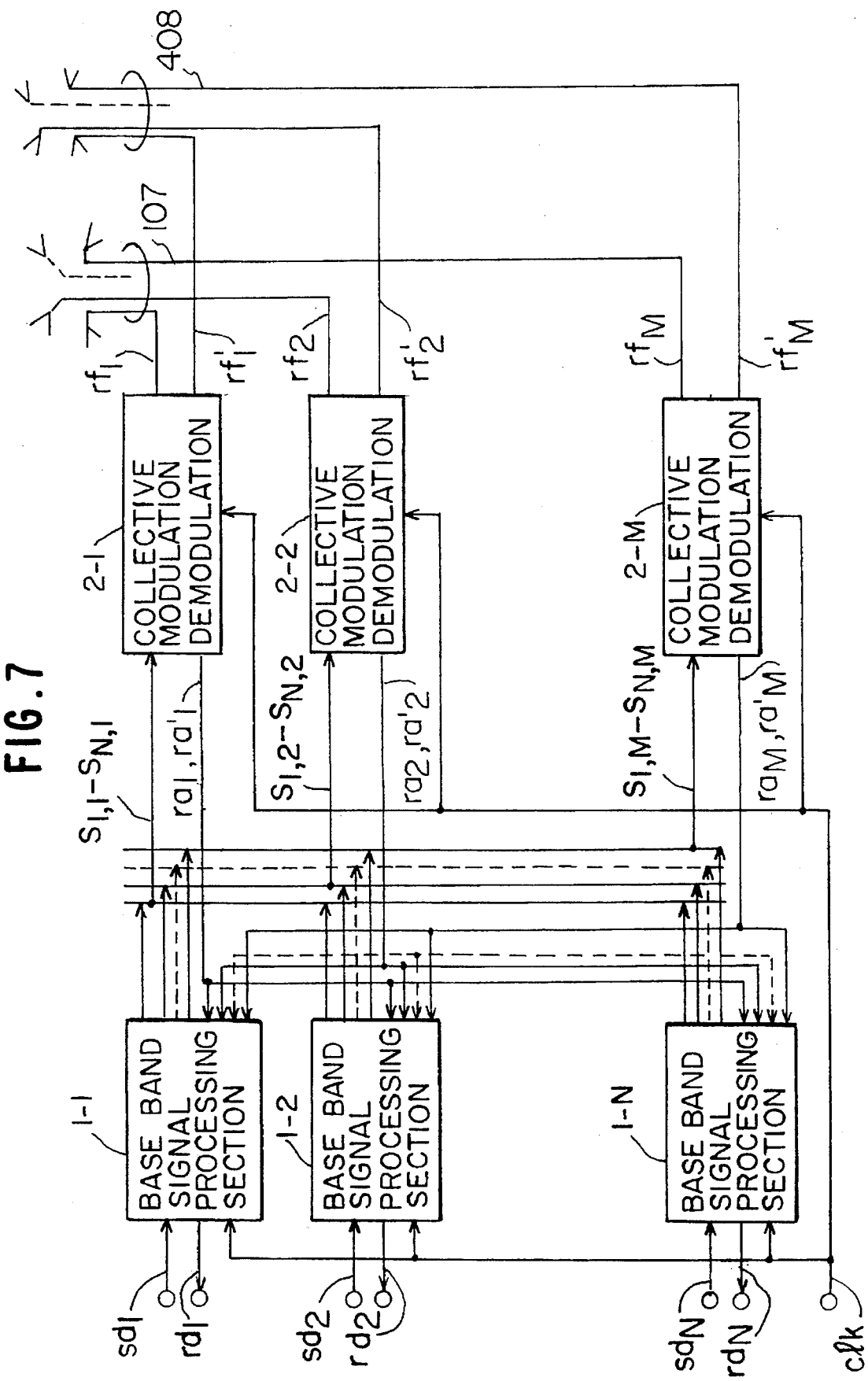
FIG. 7 is a block diagram showing a second embodiment of the present invention.

FIG. 7 is a block diagram showing the construction of the second embodiment of the present invention. The second embodiment includes, in addition to the components of the first embodiment, a sector antennae 408 which is for reception exclusively. Further, collective modulation-demodulation sections 2-1 to 2-M correspond to the two reception antennae, and baseband signal processing sections 1-1 to 1-N receive two reception signals ran and ran' from collective modulation-demodulation sections 2-1 to 2-M for the individual sectors.

Figure 8:
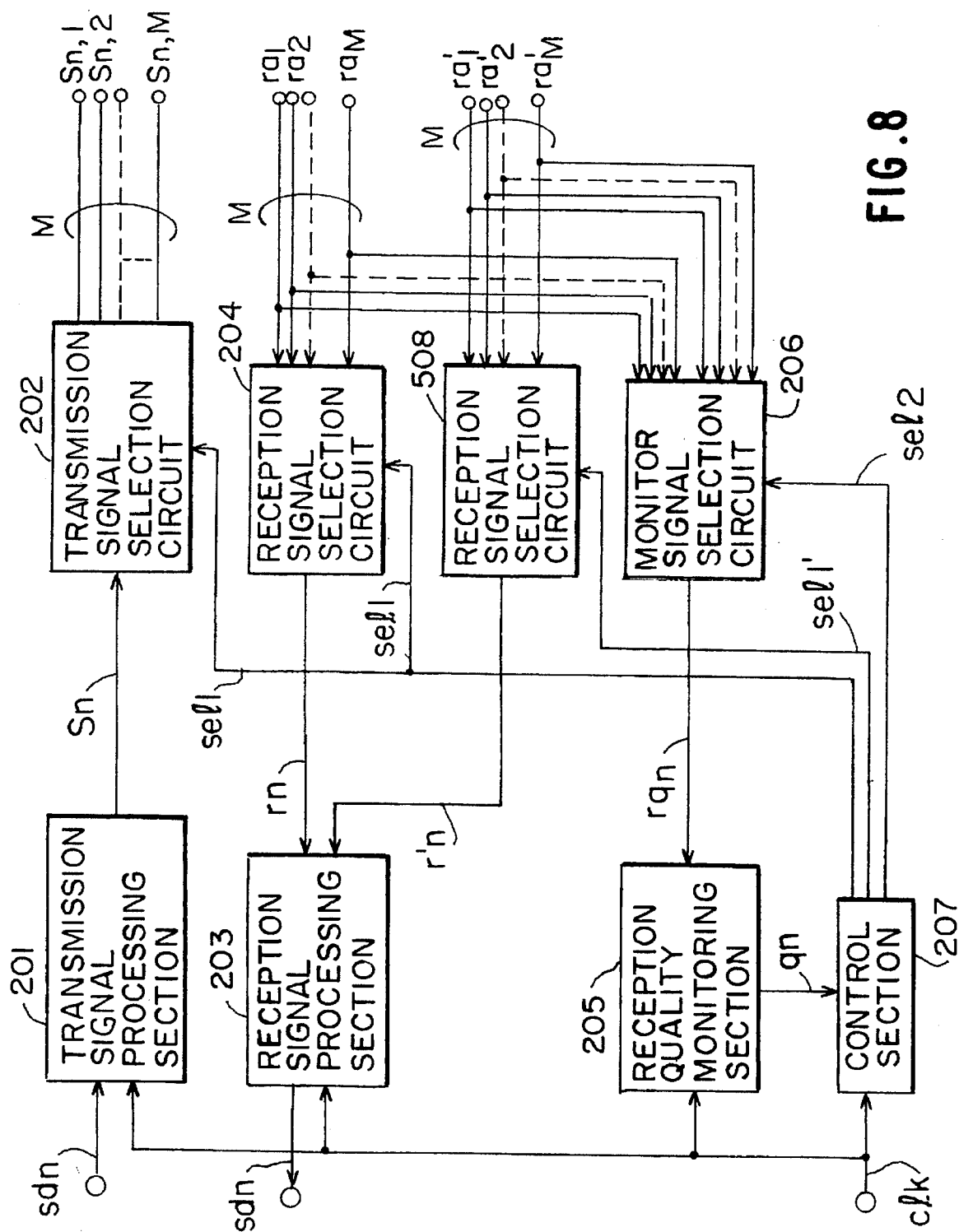
FIG. 8 is a block diagram showing a baseband signal processing section of the second embodiment of the present invention.

FIG. 8 is a block diagram showing the baseband signal processing sections in the second embodiment. Each of the baseband signal processing sections in the second embodiment includes, in addition to the components of that in the first embodiment, a second reception signal selection circuit 508 for selecting a reception signal from the second sector antenna 408. The reception signal processing section 203 inputs two reception signals rn and rn' in order to perform diverse composition. The monitor signal selection signal 206 can select a reception signal of an antenna and a sector designated by sel2 signal from within the antennae for the M sectors each including two antennae. The control section 207 selects an optimum sector from second sector antenna 408 and outputs selection signal sell' to the second reception signal selection circuit 508. It is to be noted that the same sector is not always selected between the first antennae and the second antennae.

FIG. 9 is a block diagram showing the construction of collective modulation-demodulation sections 2-1 to 2-M in the second embodiment. Each of collective modulation-demodulation sections 2-1 to 2-M in the second embodiment includes, in addition to the components of each of the collective modulation-demodulation sections in the first embodiment, a second frequency conversion section 608 and a second analog-to-digital conversion section 609 corresponding to the sector antenna 408 that is used exclusively for reception. It is to be noted that, as described hereinabove in connection with the prior art, the base station transmission-reception apparatus of the cell system includes a transmission line interface section with the control center, a supervision control section for the entire apparatus, etc., while the transmitter-receiver has the functions of demultiplexing of a TDMA signal, demultiplexing of an information channel and a control channel, and so on. However, since these portions are not related directly to the present invention and the prior art can be applied without change, description of these parts is omitted in the embodiment of the present embodiment.

Further, while a fixed channel allocation system and a dynamic channel allocation system are known as systems for allocating a frequency to each communication channel in a cellular system, the base station transmission-reception apparatus of the present invention premises a dynamic channel allocation system. This is because a fixed allocation system requires variation of the frequency for each sector, and therefore requires complicated control in order to achieve the effects of the present invention.

According to the present invention, even if the number of sectors is increased, the load to the control center arising from hand-over between sectors is not increased, and even if the number of sectors is increased, the number of processing sections for each channel is not increased, and in addition, the number of ratio sections per base station can be decreased.

What is claimed is:

1. A base station transmission-reception apparatus for a cellular system, comprising:

M sector antennae provided in a number equal to the number of sectors;

M collective modulation-demodulation sections connected to said M sector antennae; and N baseband signal processing sections provided in a number equal to the number of communication channels and connected to said M collective modulation-demodulation sections;

each of said baseband signal processing sections including:

a control section for controlling a selection signal for controlling a transmission condition;

a transmission signal processing section for producing a transmission signal in the form of a digital signal in accordance with a modulation method from transmission data;

a transmission signal selection circuit for outputting the transmission signal from said transmission signal processing section to only one of said sector antennae which is indicated by the selection signal;

a reception signal selection circuit for selecting and outputting one of M reception signals received by said sector antennae which is indicated by the selection signal; and a reception signal processing section for detecting reception data corresponding to its own communication channel from the reception signal from said reception signal selection circuit;

each of said collective modulation-demodulation sections including:

transmission processing means for converting transmission signals from the transmission signal selection circuits into a transmission radio signal in the form of an analog signal and supplying the resulted signal to said sector antennae;

frequency conversion means for converting reception radio signals of a bandwidth corresponding to the N communication channels received by said sector antennae collectively into a baseband signal by frequency conversion; and an analog-to-digital converter for converting the base band signal (analog) from said frequency conversion means into a digital signal and supplying the digital signal to the reception signal selection circuits.

2. A base station transmission-reception apparatus as claimed in claim 1, wherein each of said baseband signal processing sections further includes:

a monitor signal selection circuit for selecting one reception signal from said collective modulation-demodulation sections and outputting the selected reception signal as a monitoring reception signal; and a reception quality monitoring section for monitoring the reception quality of the monitoring reception signal from said monitor signal selection circuit and supplying a monitor signal to said control section;

said control section providing the selection signal for selecting a sector of the best reception quality to said transmission signal selection signal and said reception signal selection circuit in response to the monitor signal.

3. A base station transmission-reception apparatus for a cellular system, comprising:

M first and second sector antennae provided for individual sectors for performing diversity reception;

M collective modulation-demodulation sections connected to said M first and second sector antennae; and N baseband signal processing sections provided in a number equal to the number of communication channels and connected to said M collective modulation-demodulation sections;

each of said baseband signal processing sections including:

a control section for outputting a selection signal for controlling the transmission condition;

a transmission signal processing section for producing a transmission signal in the form of a digital signal in accordance with a modulation method from transmission data;

a transmission signal selection circuit for outputting the transmission signal from said transmission signal processing section to only one of said sector antennae which is indicated by the selection signal;

a first reception signal selection circuit for selecting and outputting a reception signal of a sector indicated by the selection signal from among M reception signals received by said first M sector antennae;

a second reception signal selection circuit for selecting and outputting a reception signal of a sector indicated by the selection signal from among M reception signals received by said second M sector antennae; and a reception signal processing section for performing diversity reception from the reception signals from the first and second M reception signal selection circuits to detect reception data corresponding to its own communication channel;

each of said collective modulation-demodulation sections including:

transmission processing means for converting transmission signals from the transmission signal selection circuits into a transmission radio signal in the form of an analog signal and supplying the resulted signal to said sector antennae;

frequency conversion means for converting reception radio signals of a bandwidth corresponding to the N communication channels received by said sector antennae collectively into a baseband signal by frequency conversion; and an analog-to-digital converter for converting the base band signal (analog) from said frequency conversion means into a digital signal and supplying the digital signal to the reception signal selection circuits.

4. A base station transmission-reception apparatus as claimed in claim 3, wherein each of said baseband signal processing sections further includes:

a monitor signal selection circuit for selecting one reception signal from said collective modulation-demodulation sections and outputting the selected reception signal as a monitoring reception signal; and a reception quality monitoring section for monitoring the reception quality of the monitoring reception signal from said monitor signal selection circuit and supplying a monitor signal to said control section;

said control section providing the selection signal for selecting a sector of the best reception quality to said transmission signal selection signal and said reception signal selection circuit in response to the monitor signal.

\* \* \* \* \*